(12) United States Patent
Dooley, Jr. et al.

(10) Patent No.: US 7,081,232 B1
(45) Date of Patent: Jul. 25, 2006

(54) CHEMICAL FEEDER

(75) Inventors: Gerard F. Dooley, Jr., Wexford, PA (US); Richard H. Ferguson, Cecil, PA (US); Stanley R. Pickens, Monroeville, PA (US); Frank E. Schiffman, Pittsburgh, PA (US)

(73) Assignee: PPG Industries, Ohio, Inc., Cleveland, OH (US)

( * ) Notice: Subject to any disclaimer, the term of this patent is extended or adjusted under 35 U.S.C. 154(b) by 773 days.

(21) Appl. No.: 10/098,949

(22) Filed: Mar. 15, 2002

(51) Int. Cl.
B01D 11/02 (2006.01)

(52) U.S. Cl. ..................................... 422/261; 422/278

(58) Field of Classification Search ............... 422/261, 422/279, 283; 137/268
See application file for complete search history.

(56) References Cited

U.S. PATENT DOCUMENTS

| | | | | |
|---|---|---|---|---|
| 2,387,945 A | 10/1945 | McDow | | 299/84 |
| 2,758,877 A | * 8/1956 | Gleason | | 422/113 |
| 3,453,083 A | * 7/1969 | Beerli | | 422/270 |
| 3,474,817 A | 10/1969 | Bates et al. | | 137/268 |
| 3,595,395 A | 7/1971 | Lorenzen | | 210/169 |
| 3,864,090 A | 2/1975 | Richards | | 23/267 |
| 4,250,911 A | 2/1981 | Kratz | | 137/268 |
| 4,732,689 A | 3/1988 | Harvey et al. | | 210/754 |
| 4,759,907 A | 7/1988 | Kawolics et al. | | 422/7 |
| 4,790,981 A | 12/1988 | Mayer et al. | | 422/263 |
| 4,842,729 A | 6/1989 | Buchan | | 210/198.1 |
| 5,007,559 A | 4/1991 | Young | | 222/1 |
| 5,086,952 A | 2/1992 | Kryk | | 222/189 |
| 5,089,127 A | 2/1992 | Junker et al. | | 210/206 |
| 5,229,084 A | 7/1993 | Livingston et al. | | 422/278 |
| 5,251,656 A | 10/1993 | Sexton | | 137/1 |
| 5,328,615 A | * 7/1994 | Pacheco et al. | | 210/634 |
| 5,384,102 A | 1/1995 | Ferguson et al. | | 422/264 |
| 5,413,280 A | 5/1995 | Taylor | | 239/10 |
| 5,427,748 A | 6/1995 | Wiedrich et al. | | 422/264 |
| 5,441,711 A | 8/1995 | Drewery | | 422/264 |
| 5,447,641 A | 9/1995 | Wittig | | 210/756 |
| 5,759,501 A | 6/1998 | Livingston et al. | | 422/275 |
| 5,932,093 A | 8/1999 | Chulick | | 210/169 |
| 5,975,113 A | 11/1999 | Haining et al. | | 137/268 |
| 6,007,788 A | 12/1999 | Bellon et al. | | 422/264 |
| 6,077,484 A | 6/2000 | Graves | | 422/277 |
| 6,210,566 B1 | 4/2001 | King | | 210/169 |
| 6,221,321 B1 | 4/2001 | Fleischer et al. | | 422/282 |
| 6,298,871 B1 | 10/2001 | Pickens et al. | | 137/268 |
| 2003/0085239 A1 | 5/2003 | Crain et al. | | 222/52 |

* cited by examiner

Primary Examiner—E. Leigh McKane
(74) Attorney, Agent, or Firm—Dennis G. Millman (57) ABSTRACT

An apparatus for dissolving and delivering a solution of a solid chemical material, such as calcium hypochlorite, is described. The apparatus includes in combination: a container, a lid removably mounted on the upper end of the container, and a housing. In operation, the lid is mounted on the container, which contains solid chemical material, and both are inverted and placed on top of the housing. A nozzle within the housing extends through a hole in the lid into the internal space of the container such that dissolving fluid is charged into the container through the nozzle where it contacts the solid chemical material. A solution of chemical material is formed within the container and the solution drains through additional holes formed in the lid and is removed from the housing to a point of use.

71 Claims, 5 Drawing Sheets

CHEMICAL FEEDER

The present invention is directed generally to chemical feeders. In particular, the present invention is directed to apparatus for dissolving a solid chemical material in a liquid in which the chemical is soluble and for dispensing of the solution thus formed. More particularly, the present invention concerns a chemical feeder, which by virtue of unique cooperation with a disposable or replaceable chemical-bearing container, provides the means for dissolving a solid chemical and for delivery of the resultant solution, e.g., an aqueous solution of a sanitizing chemical, to an associated system, and which permits the replenishment of supply of the requisite solid chemical in a most facile manner. Still more particularly, the present invention is directed to a chemical feeder that automatically dispenses controlled amounts of an aqueous solution of sanitizing chemical, e.g., calcium hypochlorite, in a reliable, efficient and cost effective manner for the treatment of water and water systems, e.g., water treatment plants, potable water supplies, water for industrial or process usage, waste water systems, water systems for cooling towers, run-off water, swimming pools, hot tubs and the like.

Chemical feeders of various designs for producing aqueous solutions of water treating agents have been described in the art. United States patents that describe such chemical feeders are U.S. Pat. Nos. 2,387,945; 3,595,395; 3,595,786; 3,864,090; 4,584,106; 4,732,689; 4,759,907; 4,842,729; 5,089,127; 5,384,102; 5,427,748; 5,441,711; 5,447,641; 5,932,093; 6,077,484; and 6,298,871. Some of the chemical feeders in present day use are relatively expensive for the intended application, and require some technical expertise in their assembly and maintenance. Such technical expertise may not always be available, particularly in remote rural areas or in third world countries. It would be useful to have a chemical feeder of simple design that is easy to assemble and use.

In accordance with the present invention, there has now been developed an apparatus for producing a solution of a chemical material, e.g., an aqueous solution of a sanitizing chemical such as calcium hypochlorite, which is easy to assemble and operate. This novel apparatus comprises a housing having a base and side walls extending upwardly from the base, an inlet and an outlet for receiving dissolving fluid, e.g., water, and for removing a solution of chemical material respectively. Both the inlet and outlet are located in the side wall of the housing, and are generally opposite one another. The top of the side wall is adapted to receive a removable lid attached to a disposable chemical container in which solid chemical material is stored. The housing further contains a substantially upstanding nozzle located within the housing, e.g., substantially centrally within the housing, which nozzle is in liquid communication with the inlet. The top of the nozzle typically terminates at or above the side wall of the base unit.

The apparatus further comprises a hollow container adapted for storing a solid chemical material, e.g., a sanitizing chemical such as calcium hypochlorite, and a removable lid for the container. The container is generally a single-use container that is discarded after the chemical material stored in the container is depleted. The removable lid has a plurality of openings, one of which mates with the nozzle in the housing, which nozzle protrudes through the lid. In operation, the chemical-bearing container (with its lid attached) is inverted and placed onto and secured to the housing. When so positioned, the nozzle in the housing extends into the lower section of the inverted chemical container. Dissolving liquid is charged to the inlet of the housing and is ultimately sprayed into the container and into contact with the solid chemical stored in the container. The solid chemical in the container is dissolved by the dissolving liquid; the resulting chemical solution falls by means of gravity into the housing through openings in the lid; and the chemical solution is then removed from the housing through the outlet in the housing. When the chemical container is depleted of dissolvable chemical, the flow of dissolving liquid to the housing is stopped, the empty container removed from the housing, the container lid is removed and placed onto a new chemical-bearing container, and the new container inverted and placed on and secured to the housing. Alternatively, a new separate lid can be used with the new container. The flow of dissolving liquid to the housing is renewed and the process repeated until the chemical solution is no longer required.

U.S. Pat. No. 4,250,911 describes a chemical feeder comprising a casing provided with a vertically adjustable weir and a disposable container for chemicals The chemical solution produced by this feeder is withdrawn through the weir for ultimate discharge. U.S. Pat. No. 5,251,656 describes a swimming pool feeder designed to operate on the pressure side of the filter system, which feeder combines two independent canister compartments. The first compartment contains a solid material, such as water-soluble chlorine tablets, which erode by water flow in contact therewith. The second compartment contains a liquid, such as an algaecide. Each compartment can receive disposable, replaceable units.

U.S. Pat. No. 5,413,280 describes a lawn sprinkler having a base and a container housing a soluble compound, e.g., a fertilizer. The container is removably secured to the base by a threaded connection. The bottom of the container has a bore that allows water to enter the container and another bore to allow the discharge of a solution of the soluble compound. The base includes inlet and outlet orifices. Water enters the base through the inlet orifice, passes into the container until air in the container is pressurized to a level such that the air pressure and head pressure of water in the container forces the chemical solution out of the container. U.S. Pat. No. 5,759,501 describes a container for institutional detergents, which container includes a rigid large screened base and a flexible plastic film side wall heat bonded to the peripheral surface of the base. The screen contains a central opening adapted to receive water, which is sprayed up into the container. The container is filled with detergent and closed with a single heat seal along the top surface of the wall of the container, and the screen surface is closed with a removable, peel-off seal or removable cap. In operation, the container is placed into a dispenser (after removing the peel-off seal or removable cap), water sprayed up into the container and the resulting detergent mixture drips through the screen into a drain from which it is directed to a ware washing apparatus.

U.S. Pat. No. 6,007,788 also describes a single-use container for an institutional washing apparatus, such as ware-washing machines. The container has an integral dispensing opening comprising a screened bottom portion, including a water inlet adapted to permit water to be sprayed upwardly through the screened portion and to allow dissolved detergent to flow through the screened portion. The bottom of the container contains a removable cover. None of the above-referenced patents describe the present novel chemical dispensing apparatus comprising the hereinafter described combination of structurally distinguishable base, chemical container and removable container lid.

In accordance with the present invention, there is provided:

(a) a hollow container adapted to house solid chemical material, the container having a solid base, side walls and an open upper end;

(b) a lid for said container, the lid having a first opening and a plurality of additional openings in the lid spaced from the first opening;

(c) a housing having a base and side walls extending upwardly from the base, the perimeter of the top of the side walls defining an opening which is substantially the same in size and shape as the perimeter of the lid for said hollow container and which is adapted to nest with said lid, the base and side walls of said housing defining a cavity; inlet and outlet ports in the side wall of said housing, the outlet port being spaced from the inlet port; a hollow nozzle extending upwardly within said housing, the upper portion of said nozzle being adapted to mate with and protrude through said first opening in the lid, the protruding upper portion of said nozzle having at least one lateral directing orifice; and conduit means connecting the inlet port with said vertical nozzle, thereby to provide liquid communication between the inlet port and the nozzle; and (d) liquid conveying conduit means attached to the exterior of said inlet port, and liquid conveying conduit means attached to the exterior of said outlet port;

The features that characterize the present invention are pointed out with particularity in the claims, which are annexed to and form an integral part of this disclosure. These and other features of the invention, its operating advantages and the specific objects obtained by its use will be more fully understood from the following detailed description and the accompanying drawings in which preferred embodiments of the invention are illustrated and described, and in which like reference characters designate corresponding parts.

Other than in the operating examples, or where otherwise indicated, all numbers and values, such as those expressing the dimensions of the feeder and flow rates, used in the specification and claims are to be understood as modified in all instances by the term "about".

DETAILED DESCRIPTION OF THE INVENTION

Figure 1:
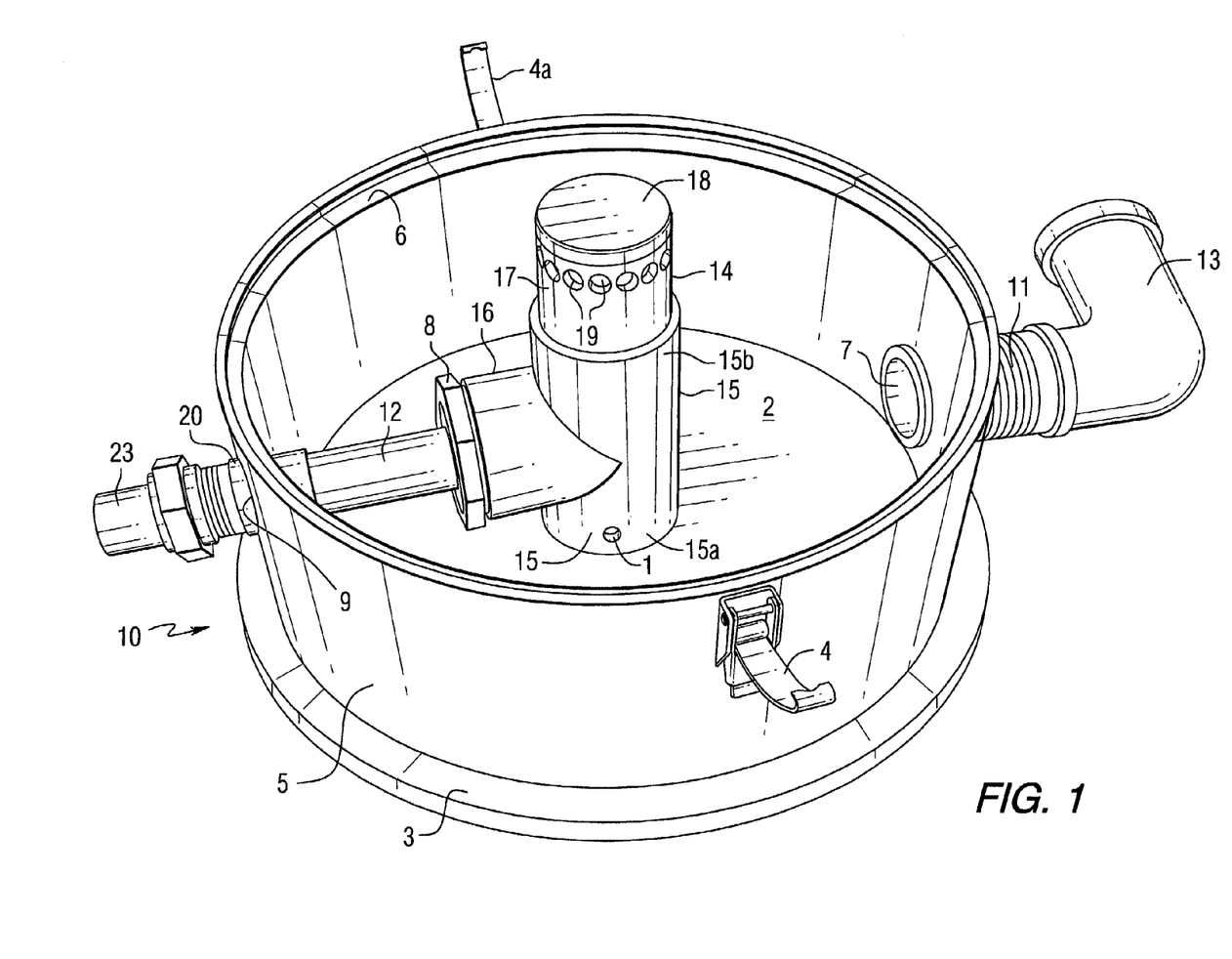
FIG. 1 is a perspective view of an embodiment of the housing of the present invention showing certain preferred embodiments of elements comprising the housing, such as distributor nozzle means, liquid conduit means and clamping means for attaching the housing to the chemical container that holds the chemical to be dissolved and dispensed.

Referring now to FIG. 1 of the drawings, there is shown a perspective view of housing 10, which comprises base member 3 and side wall 5, which extends upwardly from the base member. As shown, side wall 5 of housing 10 is substantially vertical and perpendicular to base member 3. Side wall 5 is attached to base member 3 by any suitable means that provides a leak-proof seal between the bottom of side wall 5 and base member 3. In a preferred embodiment, a groove in the shape of the bottom the side wall and as wide as the thickness of side wall 5 is routed into base 3, and the bottom of the side wall placed into and cemented into the groove. The inside of the top of side wall 5 is cut to provide a shoulder 6, on which the rim 27 of lid 30 (see FIG. 3) rests. Side wall 5 can be of any suitable height, but is preferably relatively short, as shown, i.e., its height is sufficient to accommodate the height of nozzle 15 and distributor head 14. A higher side wall would require also a higher nozzle, and thereby add to the cost of the housing because of the additional material required. While the base and side wall can be of any appropriate geometric shape, including, but not limited to, cylindrical, elliptical, rectangular or square shaped, it is preferred that they be cylindrical since such a shape facilitates fabrication with readily available materials of construction, thereby keeping manufacturing costs to a minimum. Side wall 5 has a perimeter that is substantially the same size and shape, e.g., circular, as the perimeter of and is adapted to mate with, i.e., nest with, a section of the top surface, e.g., near the outer edge, of lid 30. Base 3 can be of the same size and shape as the outside perimeter of side wall 5, or as shown in FIG. 1, the perimeter of base 3 can be slightly larger than the outside perimeter of the side wall. Base 3 need not be of the same shape as side wall 5. The base and side wall of housing 10 define a cavity 2.

Within cavity 2 is T-member nozzle 15, which as shown is located substantially centrally within cavity 2, although it could be located at some location within the cavity other than near the center of the cavity. The end of arm 15a of T-member 15 is adjacent to base member 3, and preferably is attached directly to base 3, as shown in FIG. 1. The end of the other arm 15b of T-member 15 is shown attached, e.g., cemented, to distributor head 14, which is mounted on arm 15b in a substantially upstanding vertical position, e.g., perpendicular to base 3. It is contemplated that end 15a of T-member 15 need not be adjacent to or attached to base 3, but can be supported solely by conduit 12, e.g., in an L-shaped configuration. The nozzle extends upwardly and can be adapted to be coaxial, i.e., mate with and protrude through opening 32 in lid 30. As shown, the arms and leg of T-member 15 are tubular in shape, e.g., substantially cylindrical, but they can, of course, be of any other suitable shape.

Distributor head 14 is attached to arm 15b of T-member 15 by any suitable connecting means so long as the connection is tight and does not permit leakage of dissolving liquid through the connection, i.e., is sealed in a manner that prevents leakage. Further, although shown as mounted perpendicular to the base, distributor head 14 could be mounted at an angle to the vertical, i.e., at an acute angle to vertical, e.g., 1 to 30, if that were desired. As shown, distributor head 14 is tubular in shape, e.g., substantially cylindrical, but it also can be of any other suitable shape, provided that the lower end is adapted to correspond to and fit tightly within the opening in arm 15b of T-member 15. Distributor head 14 is shaped to mate with and protrude through first opening 32 in lid 30, e.g., it is coaxial with first opening 32. The distributor head 14 and nozzle 15 are in liquid communication. Drain hole 1 is located near the bottom of arm 15a of T-member 15 (but above base 3) to allow liquid to drain out of T-member 15 when the unit is out of service. Drain hole 1 can be located anywhere around the circumference of arm 15a, e.g. opposite outlet port 7.

Figure 2A:
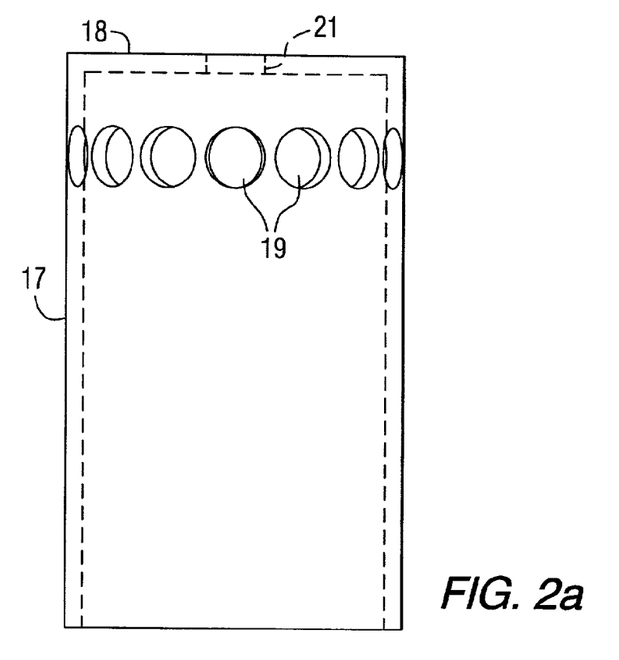
FIGS. 2a and 2b are front elevation views of distributor nozzles of different configurations that can be used with the housing of FIG. 1.

Distributor head 14 extends to a desired height and has at least one orifice 19 in the side of the upper portion 17 of the distributor head so as to provide for the lateral discharge of dissolving fluid. Advantageously, the distributor head has at least two lateral flow directing orifices, preferably greater than two orifices, e.g., four lateral flow directing orifices spaced 90° apart around the perimeter of the distributor head. More preferably, distributor head 14 has a plurality of orifices 19 around its perimeter to allow dissolving fluid to be evenly distributed radially and laterally, e.g., in a circular pattern, i.e., in a 360 pattern, as shown in FIG. 2a. The number of orifices 19 in distributor head 14 is not critical; but will depend on the desired amount of and rate at which dissolving fluid is sprayed into container 50, which in turn affects the rate of dissolution of the solid chemical in the container. Preferably, the orifices in distributor head 14 are evenly spaced around the perimeter of the distributor head. By lateral discharge is meant that the dissolving fluid emanates from the orifice in a plane that is substantially (but not solely) horizontal to the base and the major plane of the underside of lid 30. Lateral discharge includes, but is not limited to, a directional flow that can be at an angle to the point of horizontal discharge, e.g., at an acute angle that varies from the horizontal by as much as 45° from the horizontal, i.e., up to 45° above the horizontal and up to 45° below the horizontal.

The height of distributor head 14 is not critical as long as orifices 19 extend through and are above the level of lid 30 when lid 30 is mounted on top of side wall 5 of housing 10, i.e., as long as the upper portion of distributor head 14 (including orifices 19) protrudes through lid 30 into container 50 and in proximity to the solid chemical material stored in the container. Preferably, the top of distributor head 14 is at a level substantially equal to or a short distance above the top of side wall 5 of housing 10; but, other embodiments are contemplated which would allow the height of distributor head 14 to be varied. It is preferred that orifices 19 be at a level within container 50 which is close to but spaced from the underside of lid 30, which allows dissolving fluid to be sprayed into contact with the first few courses of solid chemical resting on the underside of lid 30.

Figure 2B:
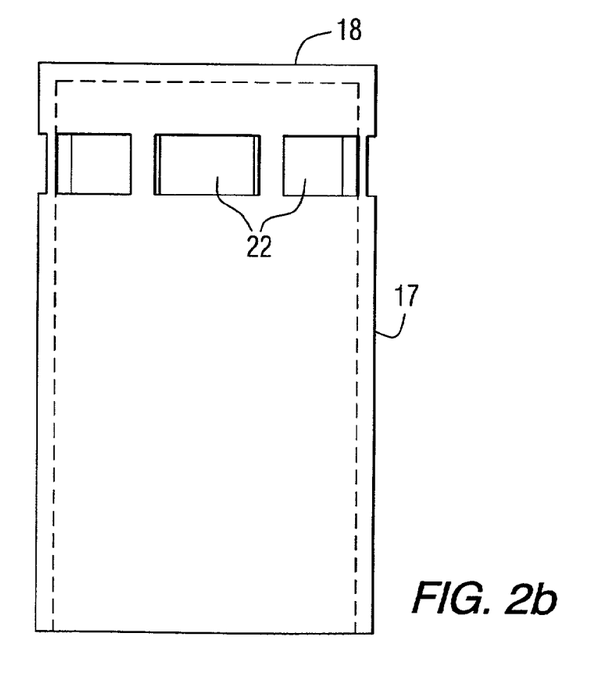

As shown in FIGS. 1 and 2b, the top or dome 18 of distributor head 14 is solid. In FIG. 2b, the orifices in the upper portion of distributor head 14 are shown as substantially rectangular slots 22. The openings in the upper portion of distributor head 14 may take any geometric shape; however, for ease of fabrication, holes or slots, e.g., rectangular-like slots, are preferred. In another contemplated embodiment, the dome or top of distributor head 14 may have at least one vertical flow directing orifice; however, the vertical orifice should not be so large as to minimize the flow of dissolving fluid through the lateral flow directing orifices. It is contemplated that the flow of dissolving fluid through the vertical orifice should be less than 50%, preferably less than 60 or 70% of the total volume of dissolving fluid passing through the distributor head. Due to size limitations, the dome of distributor head 14 will preferably have only one or two vertical flow directing orifices. FIG. 2a illustrates an embodiment in which dome 18 of distributor head 14 has one substantially upwardly directing, e.g., vertically flow directing, orifice 21, which allows dissolving fluid also to be sprayed upwardly into container 50. In operation, dissolving fluid is sprayed from the upper portion of distributor head 14 either only laterally through orifices 19, as shown in FIGS. 1 and 2b, or both upwardly and laterally through orifices 19 and 21, as shown in FIG. 2a. In either case, the orifices 19 (or orifices 19 and 21) should have a sufficient total area to accommodate the desired volume of dissolving fluid that is to be discharged without generating a significant back pressure on the system. It is contemplated that the flow of dissolving fluid discharged from distributor head 14 may range from 0.5 to 10 gallons/minute (1.9 to 37.9 (roughly 40) liters/minute), e.g., 1 to 5 gallons/minute (3.8 to 18.9 liters/minute) or 2.5 gallons/minute to 5 gallons/minute (9.5 to 18.9 liters/minute). Referring again to FIG. 1, there is shown side wall 5 having inlet port 9 and outlet port 7. Inlet port 9 and outlet port 7 are spaced from one another. As shown, these ports are opposite each other, i.e., 180 apart, but they do not have to be so spaced opposite one another or even be placed on the same horizontal plane. For example, they can be 90 apart or at any angle between 90 and 180, or from for example 45 to 90, since their function is not dependent on how far apart they are spaced from one another or the horizontal plane on which they are positioned. As shown and for convenience, they are spaced 180 apart. Inlet port 9 has a female fitting 20 mounted within port 9, and outlet port 7 has a female fitting 11 mounted within outlet port 7. Outlet port 7 has internal threads to allow discharge conduit 11, which has matching external threads, as shown, to be threaded into outlet port 7. As shown, elbow 13 is connected to discharge conduit 11. With additional suitable piping means connected to elbow 13, chemical solution is conveyed from cavity 2 to the point of use or application. Similarly, female fitting 20 is threaded internally to allow inlet conduit 23 to be connected to fitting 20. Inlet conduit 23 is connected to a source of dissolving fluid, e.g., water, not shown by suitable piping. A valve (not shown) is typically inserted in such piping in order to control the flow of dissolving fluid to the unit, i.e., to start and stop the flow of dissolving fluid and/or to control the rate at which dissolving fluid enters the unit.

Bushing 8 connects leg 16 of T-member 15 to conduit 12, which is in turn connected to female fitting 20. Conduit 12 is in liquid communication with leg 16 of nozzle 15 In operation, as shown in FIG. 1, dissolving fluid is conveyed from a source not shown by suitable piping to inlet conduit 23, and through conduit 12 into T-member 15. Dissolving fluid is forced upwardly into distributor head 14, is deflected by dome 18, and then sprayed outwardly in a radial fashion through orifices 19. If the distributor head shown in FIG. 2a is used, dissolving fluid would be sprayed also upwardly, e.g., in a vertical direction.

Figure 7:
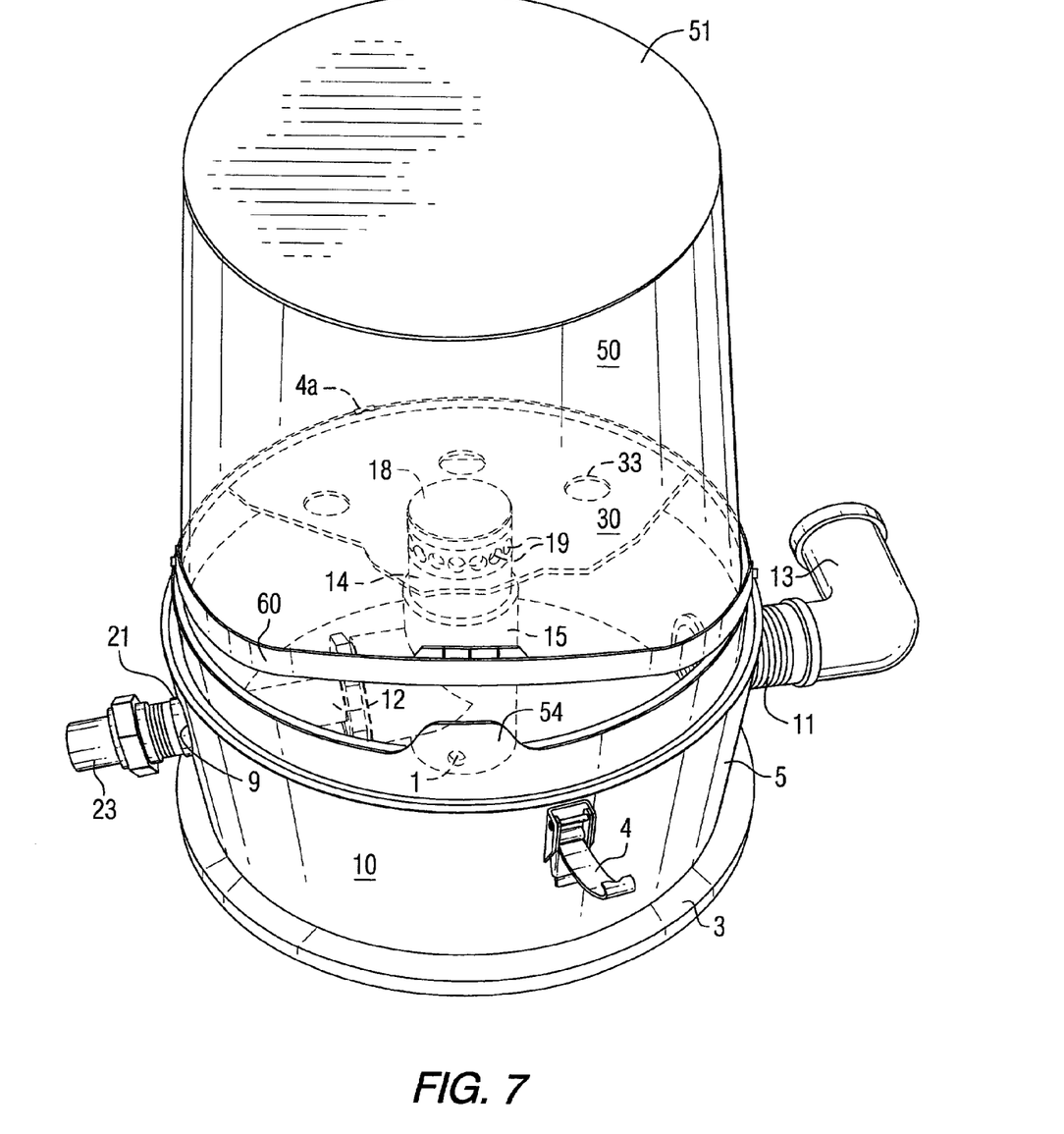
FIG. 7 is perspective view showing, in combination, the housing of FIG. 1, a chemical container attached to the housing, and a hidden section of a lid that is attached to the container.

Attached to side wall 5 are latches 4 and 4a, which are used to secure container 50 (including lid 30) to housing 10, as shown in FIG. 7. Although only two latches are shown 180° apart, more than two latches may be used. Further, other means of removably securing the container and lid to the housing so that the container can be easily detached from the housing can be used. For example, the container and housing could be fabricated in such a manner to allow the container to be attached to the housing by bolts in flanges attached to the side of the container and the housing, by a threaded connection, or other fastening means, such as clamp rings, e.g., threaded clamp rings, banded clamp rings and bolted clamp rings.

Figure 3:
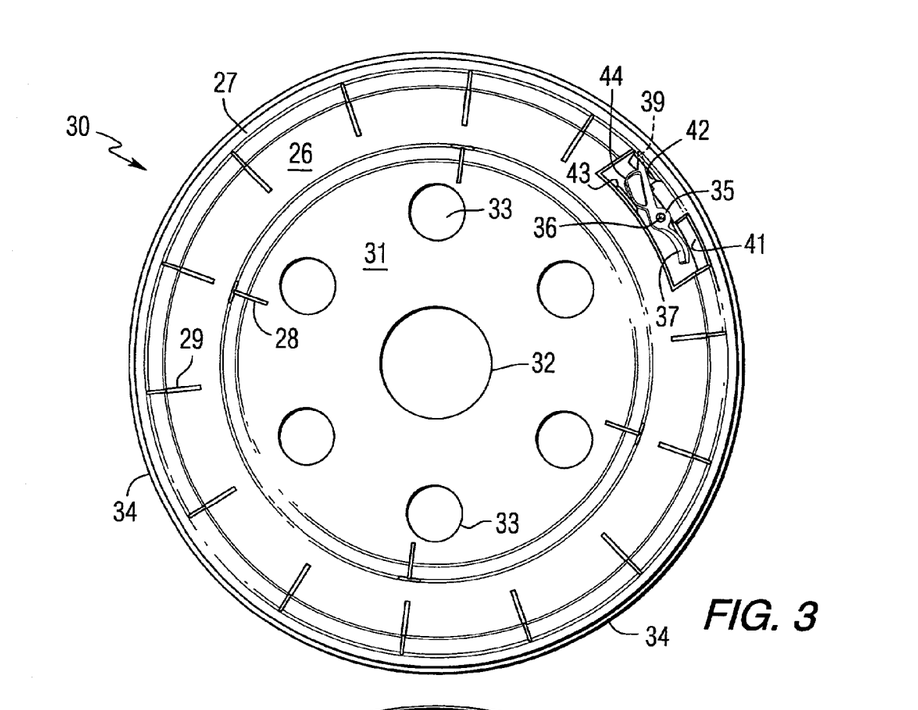
FIG. 3 is a top plan view of a lid, which can be attached to the top of the chemical container.

Referring now to FIG. 3, there is shown a top plan view of the top surface of circular lid 30, which can be attached to the top of container 50. While shown as circular, lid 30 can be of any shape that matches the opening in housing 10 and the open end of container 50. As shown in FIG. 3, lid 30 has a first opening 32, which is aligned, e.g., coaxially, and sized to mate with the upper portion 17 of distributor head 14 so that the distributor head is slidingly received easily by opening 32 and because of its length protrudes through opening 32 into a space within container 50 when the container is attached to lid 30. Preferably, first opening 32 is located substantially at the geometric center of lid 30. Further, it is preferred that central opening 32 not be significantly larger than the circumference of distributor head 14 in order to avoid the preferential flow of chemical solution formed in the container through the space between the distributor head 14 and the opening 32. In operation, the upper portion 17 of distributor head 14 slides into and through opening 32, and protrudes through opening 32 sufficiently to allow orifices 19 to also protrude into and be situated within container 50. Surrounding central opening 32 are a plurality of additional openings 33, which are usually smaller in diameter than opening 32, but may be of a similar diameter. The number and size of openings 33 may vary provided that they are of a sufficient area to allow the chemical solution formed within container 50 to drain easily out of container 50, i.e., so that the container does not become flooded with dissolving fluid and/or chemical solution, either partially or completely, at any of the selected rates at which dissolving fluid is introduced into the container. Preferably, the additional openings are evenly spaced from and radially around the first opening 32.

Lid 30 may be of any conventional construction. A lid similar in construction to that shown in FIGS. 3 and 4, but without openings 32 and 33, is available commercially. Lid 30 is substantially planar and circular in shape. For purposes of construction, lid 30 may have concentric sections that are above the major plane of the lid or recessed below the major plane of the lid. As shown, the substantially flat area 31 in the center of lid 30 is recessed below shoulder 26. Mechanical strength is provided for lid 30 by a plurality of reinforcing ribs 28 and 29, which are respectively located serially around the circumference of flat area 31 adjacent to shoulder 26, and around the circumference of shoulder 26 adjacent to rim 27. Extending downwardly from rim 27 is side wall 34. Reference is here made also to FIG. 5. Positioned on shoulder 26 adjacent to rim 27 is pawl 35, which is mounted to shoulder 26 by pin 36, which in turn allows pawl 35 to rotate in response to pressure exerted against curved section 37. When so rotated, slot 41 in side wall 34 allows curved section 37 to extend under rim 27. In its normal position, latch end 39 of pawl 35 extends beyond shoulder 26 under rim 27 through slot 42 in side wall 34 to engage the teeth 56 on collar 58 attached to container 50 (see FIG. 6). Biasing member 43, which is in operative relation to arcuate member 44, forces pawl 35 back to its normal position when the pressure against curved section 37 is removed.

Figure 4:
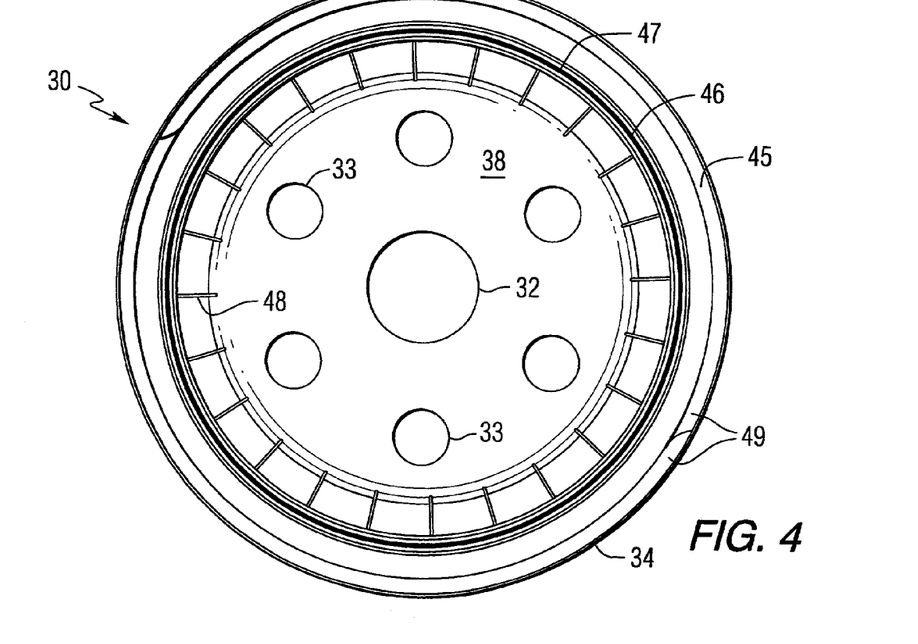
FIG. 4 is a bottom plan view of the lid of FIG. 3.
Figure 5:
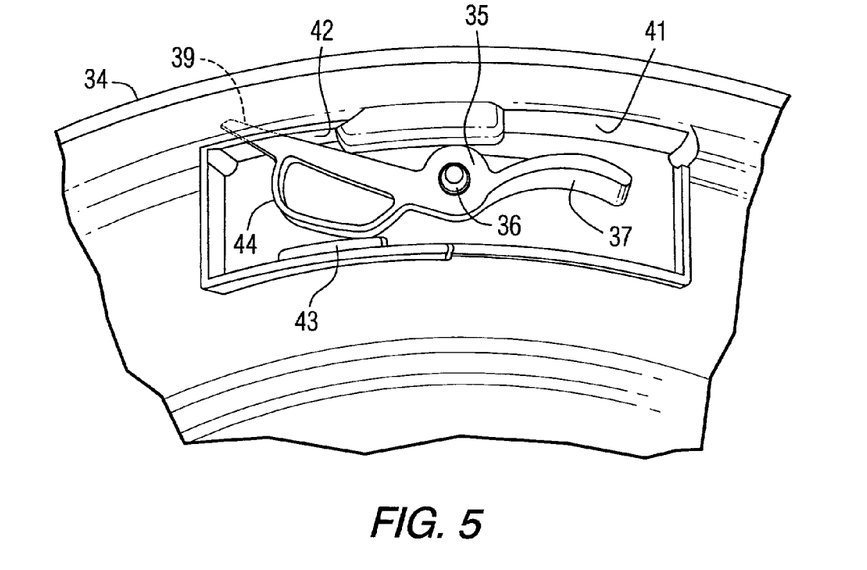
FIG. 5 is a top plan view of a section of the lid of FIG. 3 showing a partial perspective view of the pawl shown in FIG. 3.

Referring to FIG. 4, there is shown a plan view of the underside or bottom surface of lid 30. Adjacent to the underside of substantially flat area 38 are a series of reinforcing ribs 48. Also shown is channel 46 within which is O-ring 47, which contacts the top 57 of the side wall of container 50 when lid 30 is mounted on and secured to the container, thereby forming a sealed connection between the lid and the container. The inside of side wall 34 has internal thread 49 for securing the lid to annular collar 58 and container 50. Thread 49 is adapted to mate with a corresponding external thread 52 on the top of the outside wall of annular collar 58. Recess 45 permits the collar mounted around the top of container 50 to mate with the lid. Lid 30 is adapted to be removably and securely mounted on container 50, e.g., by a screwed attachment.

As shown, lid 30 is mounted onto container 50 by a threaded connection. When mounted on container 50, lid 30 is screwed onto container 50 by turning the lid clockwise until it seats against the top of container 50. The finger 39 of pawl 35 passes over teeth 56 in a ratcheting motion and prevents the lid 30 from moving in a counter clockwise direction. In order to remove lid 30, pressure is exerted against curved section 37 of the pawl until the finger end 39 is moved away, i.e., disengages, from teeth 56 and does not engage teeth 56 when lid 30 is turned in a counter clockwise direction.

Figure 6:
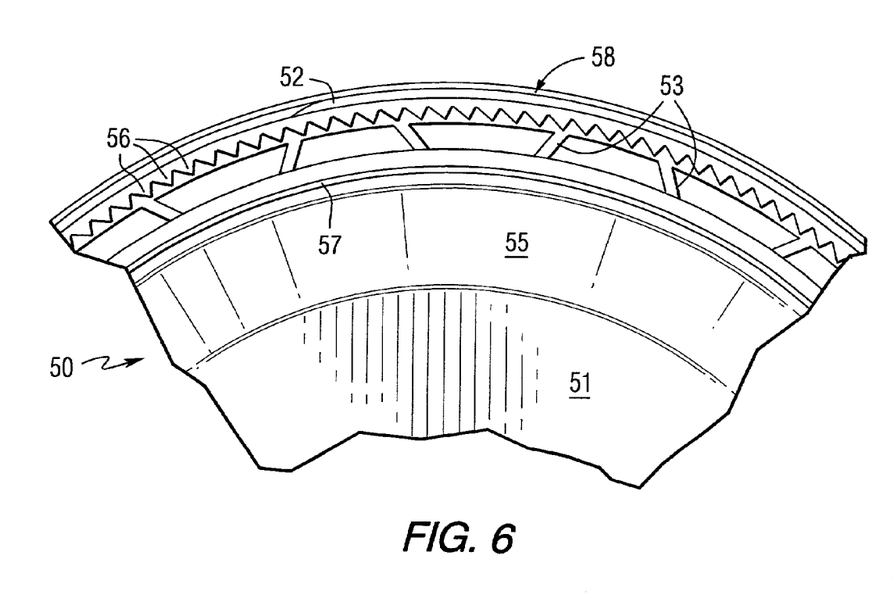
FIG. 6 is a top plan view of a section of a hollow chemical container that can be used with the lid of FIG. 3 and the housing of FIG. 1.

Referring now to FIG. 6, there is shown a partial plan view of cylindrical container 50 looking down into the container. Cylindrical container 50 has a closed bottom 51 and a side wall 55, which terminates at rim 57. Attached to but spaced from the side of container 50 is annular collar 58, which is attached to the side wall 55 by a plurality of supporting ribs 53 that are placed circumferentially around side wall 55. Annular collar 58 is next to but spaced from side wall 55 by the length of ribs 53. The top of annular collar 58 is above the top of rim 57 of container 50, which mates with recess 45 in the underside of lid 30. A plurality of teeth 56 are mounted around the inside circumference of collar 58 and are adapted to engage the finger or latch end of 39 of pawl 35, when the pawl is in its normal position. External thread 52 on collar 58 mates with internal thread 49 on lid 30.

Referring now to FIG. 7, there is shown a perspective view of the combination of housing 10, container 50 (upside down) and lid 30. Lid 30, distributor head 14 and inside piping, all of which would be hidden, are shown by dash lines. To facilitate the physical handling of container 50, particularly a container filled with solid chemical material, a handle 60 can be attached to flanges 54 (only one of which is shown), which extend from the lower portion of annular collar 58. At least two flanges (180 apart) should be used to allow the filled container to be grasped by two hands. Preferably four flanges (90 apart) are used. In addition or alternatively, a handle (not shown) can be mounted into a recess molded into the underside of the bottom of container 50 so that the handle is flush with the outside surface of the bottom of the container, as is known in the art, to facilitate handling of the container and to place it on the housing for use.

Chemical-bearing container 50 is adapted, i.e., constructed, to house and store soluble solid chemical material to be dispensed by the apparatus of the present invention. After use, container 50 could be used again by cleaning it and re-filling it with fresh solid chemical material; however, typically container 50 is a single use container, which is discarded after being removed from the housing. Container 50 may be opaque, clear or translucent, the latter two of which embodiments show the level of chemical material within the container and allows the operator to readily determine when the solid chemical material in the container is exhausted. Container 50 is typically in the shape of commercially available pails. The container shown in FIG. 6 is commercially available. Commonly, the bottom circumference of the pail is slightly smaller than the circumference of the open upper end. The size of container 50 is not critical to the operation of the feeder. However, for reasons of economics and ease of handling, the pail will have a volume of from 2.5 to 6.5 U.S. gallons (9.5 to 24.6 liters).

In practice, container 50 is filled with solid chemical material, and a solid lid of any suitable design is affixed onto the top of container 50 by the chemical supplier to seal the solid chemical material from the atmosphere. The amount of solid chemical material charged to the container will depend on the size of the container and the size and shape of the solid chemical material. Usually, from 25 to 50 pounds (11.3 to 22.7 kg) of chemical material will be charged to the container. The lid can be threaded onto the container, snapped onto the container or otherwise securely attached to the container to seal its contents from the atmosphere by any suitable attachment means known in the art. In a contemplated embodiment, a solid lid identical to lid 30, except for the absence of central opening 32 and additional openings 33, is used. The container is transported to the point of use where the solid lid is removed and replaced with lid 30, which has the openings (holes) 32 and 33.

The container and attached lid are then inverted, oriented in an upright position, placed onto housing 10, and retentively and removably secured to the housing by means of latches 4 and 4a. Dissolving fluid, e.g., water, is allowed to flow into T-member 15, which directs the fluid upwardly into distributor head 14. Dissolving fluid is deflected by the dome 18 of distributor head 14 and forced out through nozzles 19 in the distributor head. Dissolving fluid is sprayed laterally from the distributor head into the section of the container adjacent to lid 30 and into contact with the soluble chemical material previously packed therein, e.g., calcium hypochlorite, which is dissolved by the dissolving fluid. A solution of the chemical material is formed in the container, and the solution falls by gravity through the holes 33 in the lid into cavity 2 within housing 10. The chemical solution is then withdrawn from the housing through outlet fitting 11 and forwarded to the point of application. When the chemical material in the container is substantially exhausted so that the concentration of chemical within the chemical solution discharged from cavity 2 falls to a level that is not desirable, the flow of dissolving liquid to T-member 15 is stopped, solution is allowed to drain out of the container, the empty container is removed from the housing and a new full container installed in its place. Dissolving liquid is then allowed to flow again into T-member 15 and the process repeated.

The feeder works on the principle of constant contact between the solid chemical material and the dissolving fluid within a dissolving zone within the lower portion of the container adjacent to the underside of lid 30. The amount of chemical material dissolved is varied by controlling the flow rate of dissolving fluid that contacts and dissolves the chemical material within the dissolving zone and the volume of dissolving fluid in contact with the chemical material in the dissolving zone. As the lowermost solid chemical material in the dissolving zone is dissipated, additional chemical material moves in a downward direction under the influence of gravity onto the underside of lid 30. When no dissolving fluid is delivered to the unit or the delivery of dissolving fluid is stopped, no dissolution of chemical material within the container occurs since there is then no contact between the solid chemical material and the dissolving liquid—any liquid in the dissolving zone having fallen into the cavity 2 of the housing 10.

The chemical feeder described herein is relatively inexpensive to construct and maintain since it has no moving parts other than the inlet valve, which can be any valve capable of regulating the desired rate of flow of dissolving fluid, e.g., between 0 and 10 gallons per minute (0 and 37.8 (approximately 40) liters/minute), e.g., 0.5 or 1 to 10 gallons per minute (1.9 or 3.8 to 37.8 liters/min), or 2.5 to 5 gallons per minute (9.5 to 19 liters/min). The rate of flow can of course be between any of the stated values.

The feeder and control valve can be fabricated from any suitable material that is chemically and corrosion resistant to the chemical material. The feeder and its parts may be fabricated, for example, from polyethylene (high and low density), ABS (acrylonitrile-butadiene-styrene resin), fiberglass reinforced resins, polystyrene, polypropylene, or poly (vinyl chloride), chlorinated poly(vinyl chloride) or any other material that is chemically resistant to the solid chemical being dispensed, e.g., a sanitizing agent such as calcium hypochlorite, and the solution of chemical material found in the container. Other materials such as stainless steel may also be used, but the use of such material would result in a substantial increase in cost. In a preferred embodiment, the feeder is fabricated from poly(vinyl chloride) (PVC), which is generally chemically resistant to water sanitizing chemicals, such as calcium hypochlorite. The pail (container) and lid can be fabricated from PVC or polyethylene, e.g., high density polyethylene. The plastic parts from which the feeder is fabricated may be formed by injection or rotational molding.

When constructed of plastic resin material, the various parts of the feeder may be joined by appropriate adhesives or cements, solvent or heat welding or by threading. The inlet and outlet conduits may also be joined to the side wall of the housing by the use of conventional bulkhead fittings. If a metal, such as stainless steel is used, conventional welding of the parts may be used to fabricate the feeder. Alternatively, the parts of the feeder may be joined together by conventional threaded bolts and appropriate gasketing to insure that the connections are sealed against leakage.

The solid chemical material that may be used with the feeder may be any chemical that is solid at ambient conditions of temperature and pressure (STP), which may be formed into solid shapes, e.g., tablets or large pellets, that do not fall through the holes in the lid and which typically bridge across the holes in the lid, and which is readily soluble in the chosen dissolving fluid, e.g., water, at STP conditions. Examples of such chemicals can be nutrients, e.g., fertilizers; sanitizing agents, e.g., chemicals that sanitize water, such as for example, calcium hypochlorite, bromo-chloro dimethyl hydantoin, dichloro dimethyl hydantoin and chloroisocyanurates; desanitizing (dechlorination) agents such as sodium sulfite, sodium metabisulfite, sodium bisulfite, sodium thiosulfate, sodium sulfhydrate (NaSH), and sodium sulfide (Na2S); and pH control agents such as sodium bisulfate, citric acid, sodium carbonate, sodium bicarbonate and quaternary ammonium compounds, some of which may be used also as algaecides.

The dissolving fluid used will depend on the solid chemical material used and the nature of the solution desired. Typically, water and dilute aqueous solutions of the solid chemical material, i.e., more dilute than the concentration of the solution formed in the container, are used. However, any suitable dissolving fluid for the particular solid chemical material chosen, which is not corrosive to the material from which the feeder is fabricated may be used.

It will be readily appreciated by those skilled in the art that the housing of the present invention can be integrated into liquid, e.g., water, treatment facilities by appropriate piping connected to the inlet and outlet conduits. The unit may be integrated into an open or closed system. For example, the inlet conduit may be connected to a by-pass line of a main liquid, e.g., water, conduit by appropriate piping, thereby providing a source of dissolving liquid. The solution of chemical material removed through the outlet conduit is forwarded by appropriate piping to the main liquid conduit downstream of the by-pass line connection.

The present invention is more particularly described in the following examples, which are intended as illustrative only, since numerous modifications and variations therein will be apparent to those skilled in the art.

EXAMPLE 1

A chemical feeder of the type described in FIGS. 1, 3, 4, and 7 was prepared using Schedule 40 and Schedule 80 poly(vinyl chloride) (PVC) pipe and 0.5 inch (1.27 cm) PVC sheet stock. The outside diameter of base member 3 of housing 10 was 15.25 inches (39.4 cm). Side wall 5 was prepared from 14 inch (35.6 cm) Schedule 80 PVC pipe, which was attached to base 3 by forming a circular groove in the base and cementing side wall 5 into the groove with PVC cement. The height of side wall 5 was 4.75 inches (12 cm). The top of side wall 5 was machined to provide shoulder 6. Inlet port 9 was a 1 inch (2.54 cm) PVC Schedule 40 Female pipe adapter; while outlet port 7 was a 2 inch (5.1 cm) PVC Schedule 40 threaded ½ inch (1.27 cm) coupling. T member 15 was fabricated from 1 inch (2.54 cm) Schedule 40 PVC pipe. A ¼ inch (0.64 cm) drain hole was drilled into the bottom arm 15a of T member 15. Distributor head 14 having a closed dome 18 was fabricated from 1½ inch (4 cm) PVC pipe; was attached by fabricated bushing and cemented to the arm 15b of T member 15. Distributor head 14 protruded 1 inch (2.54 cm) above lid 30. A series of 16 holes ⅜ inch (0.95 cm) in diameter were drilled around the upper end 17 of distributor head 14, which also protruded above lid 30. T member 15 was connected to conduit 12 by a 1½ inch×1 inch (4×2.5 cm) bushing. Attached to side wall 5 were 2 clamps of galvanized steel for securing a pail to the housing.

Lid 30 (without holes) and pail 50 were obtained from M&M Industries, Inc. of Chattanooga, Tenn. and were fabricated from high density polyethylene. Pail 50 was a 6½ U.S. gallon (25 liter) pail. Holes were drilled in lid 30, as shown in FIG. 3. The center hole had a diameter of 2.375 inches (6 cm). Six holes 1.25 inches (3.2 cm) were drilled into the lid evenly spaced around the center hole, as shown in FIG. 3.

Pail 50 was filled with 30–35 pounds (13.6–15.8 kg) of 3⅛ inch (7.95 cm) calcium hypochlorite tablets produced by PPG Industries, Inc. Each tablet had 68% nominal (65% minimum) available chlorine. Lid 30 was screwed onto the top of pail 50 and the pail and lid inverted onto housing 10. The pail was secured to the housing with the latches 14 and 14a. Inlet port 9 and outlet port 7 were fitted with threaded male pipe adapters and connected to inlet fluid and outlet fluid conduits. The inlet fluid conduit was connected to a source of balanced (pool water parameters) pool water from a 10,000 gallon (38 cubic meters) pool.

Water having a temperature of 24–25° C. was charged to the feeder at a rate of 2.5 gallons/minute (9.5 liters/min) over a period of 4 hours. The solution of calcium hypochlorite discharged from the feeder was collected in a collection sump and pumped to a treatment tank prior to discharge. Samples of the discharged solution from conduit 13 were collected every 20 minutes. The chlorine delivery rate was calculated using the water flow rate and titrating the available chlorine concentration in the samples. The chlorine delivery rate in pounds/hour (kg/hr) over the test period was fairly constant at around 0.4 pounds/hour (0.18 kg/hr). Variations in the delivery rate of from 0.38 to 0.51 pounds/hour (0.17–0.23 kg/hr) were observed during the period of the example.

COMPARATIVE EXAMPLE A

The procedure of Example 1 was performed except that the water temperature was 20–21° C. and a distributor head without a closed dome and without any holes was used, i.e., the inlet water flowed vertically out of the distributor head 14. The chlorine delivery rate varied widely with swings from a low of around 0.50 pounds/hour (0.23 kg/hr) to a high of around 1.14 pounds/hour (0.52 kg/hr). The wide swings in chlorine delivery rate was attributed to the variation in dissolution of the calcium hypochlorite tablets caused by the vertical flow of water into the pail, which it is believed formed a hollow dome within the tablets that collapsed and formed sequentially during the period of the example, thereby varying the number of tablets in contact with the water.

EXAMPLE 2

The procedure of Example 1 was repeated except that the rate at which water was delivered to the feeder was 5 gallons/minute (18.9 liters/min) and the operating time was about 7 hours 20 minutes. The chlorine delivery rate over the test period was fairly constant at around 0.9 pounds/hour (0.4 kg/hr). Variations in the chlorine delivery rate of from 0.71 to 1.15 pounds/hour (0.32 to 0.52 kg/hr) were observed during the period of the example.

COMPARATIVE EXAMPLE B

The procedure of Comparative Example A was repeated except that the rate at which water was delivered to the feeder was 5 gallons/minute (18.9 liters/min) and the operating time was about 8 hours 40 minutes. As in Comparative Example A, the chlorine delivery rate varied widely with swings of from a low of 0.9 pounds/hour (0.4 kg/hr) to a high of 5.2 pounds/hour (2.4 kg/hr).

EXAMPLE 3

The procedure of Example 1 was repeated except that the rate at which water was delivered to the feeder was 10 gallons/minute (37.9 liters/min) and the operating time was 2 hours. The chlorine delivery rate over the test period was fairly constant at around 3.2 pounds/hour (1.5 kg/hr). Variations in the chlorine delivery rate of from 2.9 to 3.5 pounds/hour (1.3 to 1.6 kg/hr) were observed during the period of the example.

COMPARATIVE EXAMPLE C

The procedure of Comparative Example A was repeated except that the rate at which water was delivered to the feeder was 10 gallons/minute (37.9 liters/min) and the operating time was 2 hours. The chlorine delivery rate varied, although with smaller swings in rate compared to Comparative Examples A and B. The rate ranged from 8.2 to 11.7 pounds/hour (3.7 to 5.3 kg/hr).

Although the present invention has been described with reference to specific details of certain preferred embodiments thereof, it is not intended that such details should be regarded as limitations upon the scope of the invention except as and to the extend that they are included in the accompanying claims.

We claim:

1. Apparatus for preparing a solution of a solid chemical material comprising, in combination:
   (a) a container for housing solid chemical material, said container having a base, side walls and an open upper end;
   (b) a lid adapted to be removably mounted onto the open end of said container, said lid having a top surface, a bottom surface, a first opening and a plurality of additional openings spaced from said first opening in said lid; and
   (c) a housing having a base and side wall extending upwardly from said base, the base and side wall defining a cavity, the perimeter of the top of the side wall defining an opening that is substantially the same shape and size as the perimeter of said lid, the top of the side wall being adapted to mate with a section of the top surface of said lid; inlet and outlet ports in the side wall, said ports being spaced from one another; an upwardly extending nozzle situated within the cavity of the housing, the upper portion of said nozzle having a distributor head that is adapted to mate with and protrude through the first opening in the lid, the protruding portion of the distributor head having at least one orifice that directs fluid discharged from the orifice in a lateral direction; and liquid conduit means connecting the inlet port with said nozzle.

2. The apparatus of claim 1 wherein the lid is a substantially planar lid.

3. The apparatus of claim 1 wherein the first opening is situated at substantially the geometric center of the lid.

4. The apparatus of claim 3 wherein the additional openings are evenly spaced around the first opening.

5. The apparatus of claim 1 wherein the base and side wall of the housing form a cylinder.

6. The apparatus of claim 1 wherein the top of the side wall of the housing is adapted to mate with the top surface of the lid at a location near the outer edge of the lid.

7. The apparatus of claim 1 wherein the nozzle and distributor head are cylindrical.

8. The apparatus of claim 1 wherein a plurality of lateral flow directing orifices are spaced around the perimeter of the distributor head.

9. The apparatus of claim 8 wherein the distributor head also has at least one vertical flow directing orifice.

10. Apparatus for preparing a solution of a solid chemical material comprising, in combination:
    (a) a substantially cylindrical container for holding solid chemical material, said container having a base, side wall and an open upper end;
    (b) a substantially planar lid adapted to be removably mounted securely onto the open end of the container, said lid having a top surface, a bottom surface, a first opening and a plurality of additional openings spaced from said first opening in said lid; and
    (c) a substantially cylindrical housing having a base and side wall extending upwardly from said base, the base and side wall defining a cavity, the perimeter of the top of the side wall defining an opening that is substantially the same as the perimeter of said lid, the top of the side wall of the housing being adapted to mate with said lid near the outer edge of the top surface of said lid; inlet and outlet ports in the side wall of the housing, said ports being spaced from one another; an upwardly extending nozzle located within the cavity, the upper portion of the nozzle having a distributor head that is adapted to mate with and protrude through the first opening in the lid, the protruding portion of the distributor head having at least one orifice that directs fluid discharged from the orifice in a lateral direction; and liquid conduit means connecting the inlet port with said nozzle.

11. The apparatus of claim 10 wherein the lid is mounted onto the container by means of a threaded connection.

12. The apparatus of claim 10 wherein the first opening in the lid is near the geometric center of the lid.

13. The apparatus of claim 10 wherein the inlet and outlet ports are located substantially opposite one another in the side wall of the housing.

14. The apparatus of claim 13 wherein the additional openings in the lid are evenly spaced radially around the first opening.

15. The apparatus of claim 10 wherein a plurality of lateral fluid flow directing orifices are spaced around the perimeter of the distributor head.

16. The apparatus of claim 10 wherein the distributor head also has at least one vertical fluid flow directing orifice.

17. The apparatus of claim 16 wherein the vertical flow directing orifice is in the top of the distributor head.

18. Apparatus for preparing a solution of a solid chemical material comprising, in combination:
    (a) a substantially cylindrical container adapted to hold solid chemical material, said container having a base, side wall and an open upper end;
    (b) a substantially planar circular lid adapted to be removably mounted securely onto the open end of the container, the lid having a top surface, a bottom surface, a first opening near the geometric center of the lid and a plurality of additional openings around and spaced from the first opening; and
    (c) a substantially cylindrical housing having a base and side wall extending upwardly from said base, the base and side wall defining a cavity, the perimeter of the top of the side wall of the housing defining an opening that is substantially the same as the perimeter of the lid, the top of the side wall of the housing being adapted to nest with the lid near the outer edge of the top surface of said lid; inlet and outlet ports in the side wall of the housing, said ports being spaced from one another; an upwardly extending nozzle located within and near the center of the cavity, the upper portion of the nozzle having a distributor head that is adapted to mate with and protrude through the first opening in the lid, the protruding portion of the distributor head having at least one orifice that directs fluid discharged from the orifice in a lateral direction; and liquid conduit means connecting the inlet port with said nozzle, thereby to provide liquid communication between the inlet port and the distributor head of the nozzle.

19. The apparatus of claim 18 wherein the bottom of the nozzle is attached to the housing base.

20. The apparatus of claim 19 wherein the nozzle is in the shape of a T, wherein one arm of the T is affixed to the housing base, the other arm is attached to the distributor head, and the leg of the T is attached to the liquid conduit means connecting the inlet port and the nozzle.

21. The apparatus of claim 18 wherein the container has a handle.

22. The apparatus of claim 18 wherein piping means connects the inlet port to a source of dissolving fluid and other piping means connects the outlet port to the point of use of the solution of solid chemical material.

23. The apparatus of claim 18 wherein the housing is fabricated from poly(vinyl chloride).

24. The apparatus of claim 18 wherein the housing, lid and container are each fabricated from a material selected from the group consisting of poly(vinyl chloride), polyethylene, acrylonitrile-butadiene-styrene resin, fiberglass reinforced resins, polystyrene, polypropylene and chlorinated poly(vinyl chloride).

25. The apparatus of claim 18 wherein the lid is mounted onto the container by means of a threaded connection.

26. The apparatus of claim 18 wherein the inlet and outlet ports are located substantially opposite one another in the side wall of the housing.

27. The apparatus of claim 18 wherein a plurality of lateral fluid flow directing orifices are spaced around the perimeter of the distributor head.

28. The apparatus of claim 18 wherein the distributor head also has a vertical fluid flow directing orifice.

29. The apparatus of claim 28 wherein the vertical flow directing orifice is in the top of the distributor head.

30. Apparatus for preparing a solution of a solid chemical material comprising, in combination:
  (a) a substantially cylindrical container adapted to hold solid chemical material, said container having a closed bottom, a side wall and an open upper end;
  (b) a substantially planar circular lid adapted to be removably mounted securely onto the open end of the container, the lid having a top surface, a bottom surface, a first opening near the geometric center of the lid and a plurality of additional openings around and spaced from the first opening; and
  (c) a substantially cylindrical housing having a base and side wall extending upwardly from said base, the base and side wall defining a cavity, the perimeter of the top of the side wall of the housing defining an opening that is substantially the same as the perimeter of the lid, the top of the side wall of the housing being adapted to nest with the lid near the outer edge of the top surface of said lid; inlet and outlet ports in the side wall of the housing, said ports being spaced from one another; a vertical nozzle located within and near the center of the cavity, the bottom of the nozzle being adjacent to the base of the housing, the upper portion of the nozzle having a distributor head that is adapted to mate with and protrude through the first opening in the lid, the protruding portion of the distributor head having a plurality of orifices that directs fluid discharged from the orifice in a lateral direction; and liquid conduit means connecting the inlet port with said vertical nozzle, thereby to provide liquid communication between the inlet port and the distributor head.

31. The apparatus of claim 30 wherein the bottom of the nozzle is attached to the base of the housing.

32. The apparatus of claim 31 wherein the lid is mounted on the container by means of a threaded connection.

33. The apparatus of claim 32 wherein the inlet port and outlet port are positioned substantially opposite one another in the side wall of the housing.

34. The apparatus of claim 31 wherein the housing and nozzle are fabricated from poly(vinyl chloride).

35. The apparatus of claim 34 wherein the container and lid are fabricated from high density polyethylene.

36. The apparatus of claim 35 wherein the container is a pail.

37. The apparatus of claim 30 wherein the outside of the housing side wall has latching means for securing the container and lid to the housing.

38. The apparatus of claim 30 wherein the lower portion of the nozzle has a drain hole in the side of the nozzle near the bottom of the nozzle.

39. Apparatus for preparing a solution of a solid chemical material comprising, in combination:
  (a) a solid chemical-containing pail, said pail having a closed bottom, a side wall and an open upper end;
  (b) a substantially planar circular lid adapted to be removably attached to the open end of the pail, said attachment providing a liquid seal, said lid having a top surface, a bottom surface, a first opening at the substantial center of the lid, and a plurality of additional openings evenly spaced radially around said first opening; and
  (c) a substantially cylindrical housing having a base and side wall extending upwardly from said base, the base and side wall defining a cavity, the perimeter of the top of the side wall of the housing defining an opening that is substantially the same as the perimeter of the lid, the top of the side wall of the housing being adapted to nest with the outer edge of the top surface of said lid; inlet and outlet ports in the side wall of the housing, said ports being spaced from one another; a vertical tubular nozzle located within and near the center of the cavity, the bottom of said nozzle being adjacent to the base of the housing, the upper portion of the nozzle having a tubular distributor head that is adapted to mate with and protrude through the first opening in the lid, the protruding portion of the distributor head having a plurality of lateral fluid flow directing orifices spaced around the perimeter of the distributor head, said nozzle and said distributor head being in liquid communication; and liquid conduit means connecting the inlet port with said vertical nozzle, thereby to provide liquid communication between the inlet port and the distributor head.

40. The apparatus of claim 39 wherein the container is a pail and wherein the closed bottom of the pail has a circumference that is smaller than the circumference of the open end of the pail.

41. The apparatus of claim 39 wherein the inlet and outlet ports are substantially opposite one another.

42. The apparatus of claim 39 wherein the orifices in the distributor head are circular, and the nozzle is attached to the base within the cavity.

43. The apparatus of claim 42 wherein the distributor head has at least one vertical fluid flow directing orifice in the top of the distributor head.

44. The apparatus of claim 42 wherein the lid is attached to the pail by a threaded connection.

45. The apparatus of claim 44 wherein the outside of the housing side wall has latching means for securing the pail and lid to the housing.

46. The apparatus of claim 39 wherein the orifices in the distributor head are in the shape of rectangular slots.

47. The apparatus of claim 46 wherein the distributor head has at least one vertical fluid flow directing orifice in the top of the distributor head.

48. The apparatus of claim 39 wherein the solid chemical material is calcium hypochlorite.

49. An article of manufacture comprising a cylindrical housing having a flat base and upwardly extending side wall, the base and side wall defining a cavity; inlet and outlet ports in the side wall, said ports being spaced from one another; an upwardly extending nozzle located within and near the center of the cavity, the bottom of the nozzle being affixed to the base of the housing, the upper portion of the nozzle having a distributor head that has a plurality of lateral fluid flow directing orifices around the perimeter of the distributor head; liquid conduit means connecting the nozzle to the inlet port, thereby to provide liquid communication between the inlet port and the distributor head, wherein the lower portion of the nozzle has a drain hole in the side of the nozzle near the bottom of the nozzle and a container having a lid, and wherein the top of the side wall of the housing is adapted to mate with the lid of the container, the lid having a first opening adapted to mate with the distributor head, which distributor head protrudes through the first opening, said lid further having a plurality of additional openings spaced from and surrounding the first opening.

50. The article of claim 49 wherein clamping means are attached to the outside of the side wall of the housing to hold the container to the housing when the combined lid—container is mounted on the housing.

51. An article of manufacture comprising a cylindrical housing having a base and side wall extending upwardly from the base, the base and side wall defining a cavity; inlet and outlet ports, said ports being spaced from one another; an upwardly extending vertical and tubular nozzle located within said cavity, the upper portion of the nozzle having a distributor head having at least one orifice that directs liquid in a lateral direction, the nozzle and distributor head being in liquid communication; liquid conduit means connecting the nozzle and the inlet port; and a container having a lid wherein the top of the side wall comprises a shoulder adapted to mate with the lid of the container and wherein the distributor head is located above the top of the side wall, whereby the distributor head is configured to protrude through a corresponding opening in the lid, wherein the bottom of the nozzle is attached to the base, the inlet and outlet ports are substantially opposite one another in the side wall of the housing, and the at least one orifice in the distributor head is circular.

52. The article of claim 51 wherein the distributor head has at least one vertical fluid flow directing orifice in the top of the distributor head.

53. An article of claim manufacture comprising a cylindrical housing having a base and side wall extending upwardly from the base, the base and side wall defining a cavity; inlet and outlet ports, said ports being spaced from one another; an upwardly extending vertical and tubular nozzle located within said cavity, the upper portion of the nozzle having a distributor head having at least one orifice that directs liquid in a lateral direction, the nozzle and distributor head being in liquid communication; liquid conduit means connecting the nozzle and the inlet port; and a container having a lid, wherein the top of the side wall comprises a shoulder adapted to mate with the lid of the container and wherein the distributor head is located above the top of the side wall, whereby the distributor head is configured to protrude through a corresponding opening in the lid, wherein the bottom of the nozzle is attached to the base, the inlet and outlet ports are substantially opposite one another in the side wall of the housing, and the at least one orifice in the distributor head is in the shape of substantially rectangular slots.

54. The article of claim 53 wherein the distributor head has at least one vertical fluid flow directing orifice in the top of the distributor head.

55. A method for preparing a solution of a solid chemical material comprising:
(a) providing a housing having a substantially flat base and upwardly extending side wall, the base and side wall forming a cavity, the side wall having an inlet port and an outlet port spaced from the inlet port, the housing further having a substantially vertical nozzle within and near the center of the cavity, the bottom of the nozzle being adjacent to the base and the top of the nozzle having a distributor head, the distributor head having a plurality of lateral flow directing orifices, the distributor head and nozzle being in liquid communication; and liquid conduit means connecting the inlet port and the nozzle;
(b) providing a container within which solid chemical material is housed, said container having a closed base, side wall and an open upper end, said container further having a substantially planar lid removably mounted on the open end of the container, said lid having a top surface, a bottom surface, a first opening near the center of the lid and a plurality of additional openings around the first opening, the perimeter of the lid being substantially the same as the perimeter of the side wall of the housing, the top surface of said lid being adapted to nest with the top of the side wall of the housing, and said first opening in the lid being adapted to mate with the distributor head in a manner such that the upper portion of the distributor head and the orifices contained therein protrude through the first opening;
(c) inverting and mounting the lid—container combination on top of the housing;
(d) charging dissolving fluid for said solid chemical material to the inlet port of the housing, thereby discharging dissolving fluid from the orifices in the distributor head into the container and into contact with solid chemical material housed within the container, and thereby forming a solution of said chemical material;
(e) allowing the solution of chemical material to fall through the additional openings in the lid and into the cavity; and
(f) removing chemical material solution from the cavity through the outlet port.

56. The method of claim 55 wherein the solid chemical material is calcium hypochlorite.

57. The method of claim 56 wherein the calcium hypochlorite is in the form of tablets.

58. The method of claim 55 wherein the dissolving fluid is water and the water is charged to the inlet port at a rate of from 0.5 to 10 gallons per minute.

59. The method of claim 55 wherein the dissolving fluid is water and the water is charged to the inlet port at a rate of from 1 to 5 gallons per minute.

60. The method of claim 55 wherein the orifices are selected from circular holes and substantially rectangular slots.

61. The method of claim 60 wherein the distributor head has in addition at least one vertical fluid flow directing orifice.

62. The method of claim 55 wherein the bottom of the nozzle is attached to the base and the inlet and outlet ports are substantially opposite one another.

63. A method for preparing a solution of calcium hypochlorite comprising:
(a) providing a substantially cylindrical housing having a substantially flat base and an upwardly extending side wall, the base and side wall forming a cavity, the side wall having an inlet port and an outlet port spaced from the inlet port, the housing further having a substantially vertical nozzle within and near the center of the cavity, the bottom of the nozzle being attached to the base and the top of the nozzle having a distributor head, the distributor head having at least two lateral fluid flow directing orifices, the distributor head and nozzle being in liquid communication; and liquid conduit means connecting the inlet port and the nozzle;

(b) providing a container within which solid calcium hypochlorite is housed, said container having a closed base, a side wall and an open upper end, said container further having a substantially planar lid mounted on the open end of the container, said lid having a top surface, a bottom surface, a first opening near the center of the lid and a plurality of additional openings evenly spaced radially around the first opening, the perimeter of the lid being substantially the same as the perimeter of the side wall of the housing, the top surface of said lid being adapted to nest with the top of the side wall of the housing, and said first opening in the lid being adapted to mate with the distributor head in a manner such that the upper section of the distributor head and the orifices container therein protrude through the first opening;

(c) inverting and mounting the lid—container combination on top of the housing;

(d) charging water to the inlet port of the housing, thereby discharging water from the orifices in the distributor head into the container and into contact with calcium hypochlorite housed within the container, and thereby forming an aqueous solution of calcium hypochlorite;

(e) allowing the solution of calcium hypochlorite to fall through the additional openings in the lid and into the cavity; and (f) removing calcium hypochlorite solution from the cavity through the outlet port.

64. The method of claim 63 wherein the calcium hypochlorite is in the form of tablets.

65. The method of claim 64 wherein the rate of water charged to the inlet port is from 0.5 to 10 gallons per minute.

66. An article of manufacture comprising a substantially cylindrical housing having a base and side wall extending upwardly from the base, the base and side wall defining a cavity; inlet and outlet ports in the side wall of the housing, said ports being spaced from one another; a substantially cylindrical container for providing solid chemical material removably mounted atop said housing, said container having a top, a bottom and side wall that is shaped to mate with the side wall of the housing, the bottom of the container being a substantially circular planar member having a plurality of openings radially disposed in the surface of the member, the planar member having a shape that substantially matches the shape of the top of the housing, the openings in the planar member allowing liquid communication between the container and the cavity within the housing; an upwardly extending nozzle located within said cavity, said nozzle being adapted to deliver liquid for dissolving the solid chemical material to within the lower portion of the container; and liquid conduit means connecting the nozzle and the inlet port.

67. An article of manufacture comprising a housing having a base and side wall extending upwardly from the base, the base and side wall defining a cavity; inlet and outlet ports, said ports being spaced from one another; an upwardly extending nozzle located within said cavity, the upper portion of the nozzle having a distributor head having at least one orifice that directs liquid in a lateral direction, the nozzle and distributor head being in liquid communication; and liquid conduit means connecting the nozzle and the inlet port; wherein the top of the side wall comprises a shoulder adapted to mate with the lid of a container and wherein the distributor head and at least one orifice that directs liquid in a lateral direction are located above the top of the side wall, whereby the distributor head is configured to protrude through a corresponding opening in the lid.

68. The article of manufacture of claim 67 wherein the nozzle is located near the center of the cavity, the bottom portion of the nozzle being adjacent to the base.

69. The article of claim 68 wherein the bottom portion of the nozzle is attached to the base of the housing.

70. The article of claim 69 wherein the top of the nozzle is closed.

71. The article of manufacture of claim 67 wherein the housing is cylindrical, the nozzle is vertical and tubular, and the bottom of the nozzle is adjacent to the base of the housing.

* * * * *